(12) United States Patent
Brown et al.

(10) Patent No.: US 7,966,742 B2
(45) Date of Patent: Jun. 28, 2011

(54) AIR DRYER FOR OZONE AIDED COMBUSTION

(76) Inventors: Daniel Mac Brown, Grand Praire, TX (US); Bobby Joe Farmer, Gatesville, TX (US)

( * ) Notice: Subject to any disclaimer, the term of this patent is extended or adjusted under 35 U.S.C. 154(b) by 594 days.

(21) Appl. No.: 11/744,499

(22) Filed: May 4, 2007

(65) Prior Publication Data

US 2007/0258870 A1    Nov. 8, 2007

Related U.S. Application Data

(60) Provisional application No. 60/797,725, filed on May 4, 2006.

(51) Int. Cl.
  F26B 21/06   (2006.01)
  F26B 3/00    (2006.01)
  F26B 21/00   (2006.01)

(52) U.S. Cl. ............. 34/80; 34/79; 34/491; 34/570

(58) Field of Classification Search ........... 34/80, 79, 34/491, 570; 422/186.07, 186.09; 123/536, 123/537
See application file for complete search history.

(56) References Cited

U.S. PATENT DOCUMENTS

| | | | | | |
|---|---|---|---|---|---|
| 2,617,986 | A | * | 11/1952 | Miller | 96/125 |
| 4,127,395 | A | * | 11/1978 | McKey et al. | 95/10 |
| 4,308,844 | A | * | 1/1982 | Persinger | 123/539 |
| 5,207,734 | A | * | 5/1993 | Day et al. | 60/278 |
| 5,298,054 | A | * | 3/1994 | Malik | 95/99 |
| 6,352,068 | B1 | * | 3/2002 | Jacobsen | 123/585 |

* cited by examiner

*Primary Examiner* — Kenneth B Rinehart
*Assistant Examiner* — Corey Hall
(74) *Attorney, Agent, or Firm* — Eric Karich

(57) ABSTRACT

A method for increasing the efficiency of an internal combustion engine utilizes three three-way valves, one that receives ambient air through an air cleaner, a second that receives hot exhaust from a catalytic converter of the internal combustion engine, and a third that receives air from a high speed blower. The three-way valves direct ambient air through the air cleaner and into a first of three dryer canisters, and direct the dried ambient air through an ozone generator to the internal combustion engine, while concurrently directing gas from the exhaust catalytic converter to the second of the three dryer canisters, and also concurrently directing air from the high speed blower to the third of the three dryer canisters.

1 Claim, 7 Drawing Sheets

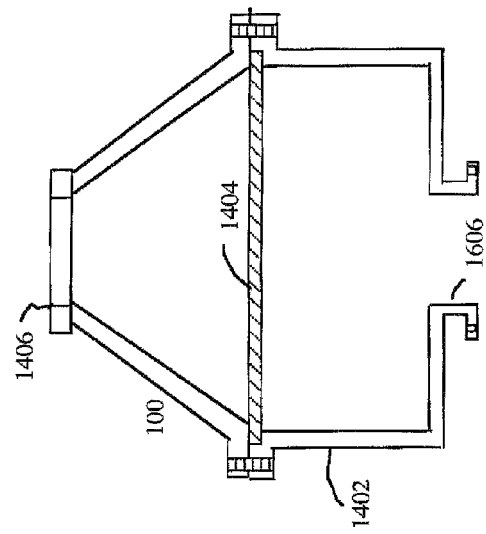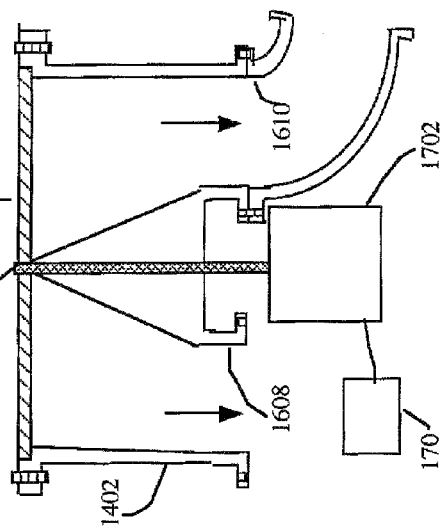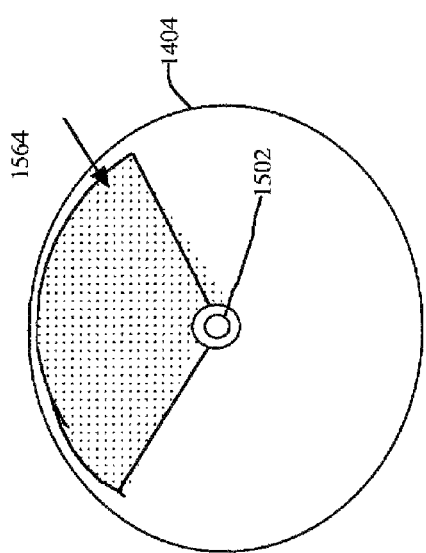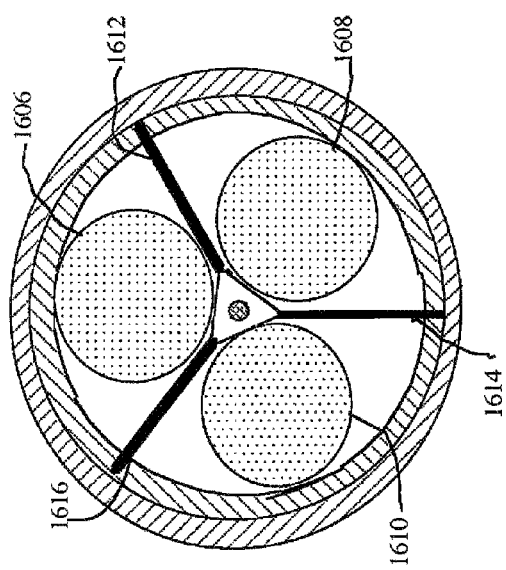

AIR DRYER FOR OZONE AIDED COMBUSTION

CROSS-REFERENCE TO RELATED APPLICATIONS

This application claims priority to provisional application 60/797,725, filed on May 4, 2006.

BACKGROUND OF THE INVENTION

1. Field of the Invention

The present invention relates to internal combustion engines, and particularly to an internal combustion that utilizes a dryer and ozone generator for supplying dried air and ozone to an air intake manifold of the internal combustion engine.

2. Description of the Related Art

There are various prior art mechanisms for achieving improved gas mileage using ozone enhancement, but none that dried the air to in addition to produce the quantities of ozone necessary.

SUMMARY OF THE INVENTION

The present invention teaches certain benefits in construction and use which give rise to the objectives described below.

The present invention provides a method for increasing the efficiency of an internal combustion engine. The method comprises the steps of providing a first three-way valve that receives ambient air through an air cleaner; providing a second three-way valve that receives hot exhaust from a catalytic converter of the internal combustion engine; providing a third three-way valve that receives air from a high speed blower; providing three dryer canisters, each dryer canister having three input valves adapted to receive air from either the first, second, or third three-way valve, each of the dryer canisters being provided with a dryer material; providing an ozone generator operably connected to the internal combustion engine; and adjusting the three-way valves to a first phase, directing ambient air through the air cleaner and into a first of the three dryer canisters, and then directing the dried ambient air through the ozone generator to the internal combustion engine, while concurrently directing gas from the exhaust catalytic converter to the second of the three dryer canisters, and also concurrently directing air from the high speed blower to the third of the three dryer canisters.

A primary objective of the present invention is to provide a method for increasing the efficiency of an internal combustion engine, the method having advantages not taught by the prior art.

Another objective is to provide a method for increasing the efficiency of an internal combustion engine by first drying ambient air, providing the dried air to an ozone generator, and then to the internal combustion engine.

A further objective is to provide a three dryer canisters that may be utilized in turn for drying the air, and following the drying operation, may be heated and dried using exhaust gases, and then cooled with a blower and further dried, so that they are prepared for further use in drying the input air.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The invention may be understood by reference to the following description taken in conjunction with the accompanying drawings, in which, like reference numerals identify like elements, and in which:

FIG. 14 illustrates a side cross-sectional view of a 3-output port valve;

FIG. 15 illustrates a sector plate the 3-output port valve;

FIG. 16 illustrates a top plan view of the valve; and

FIG. 17 illustrates a cross sectional side view of the 3-output port valve.

DETAILED DESCRIPTION OF THE INVENTION

Figure 1:
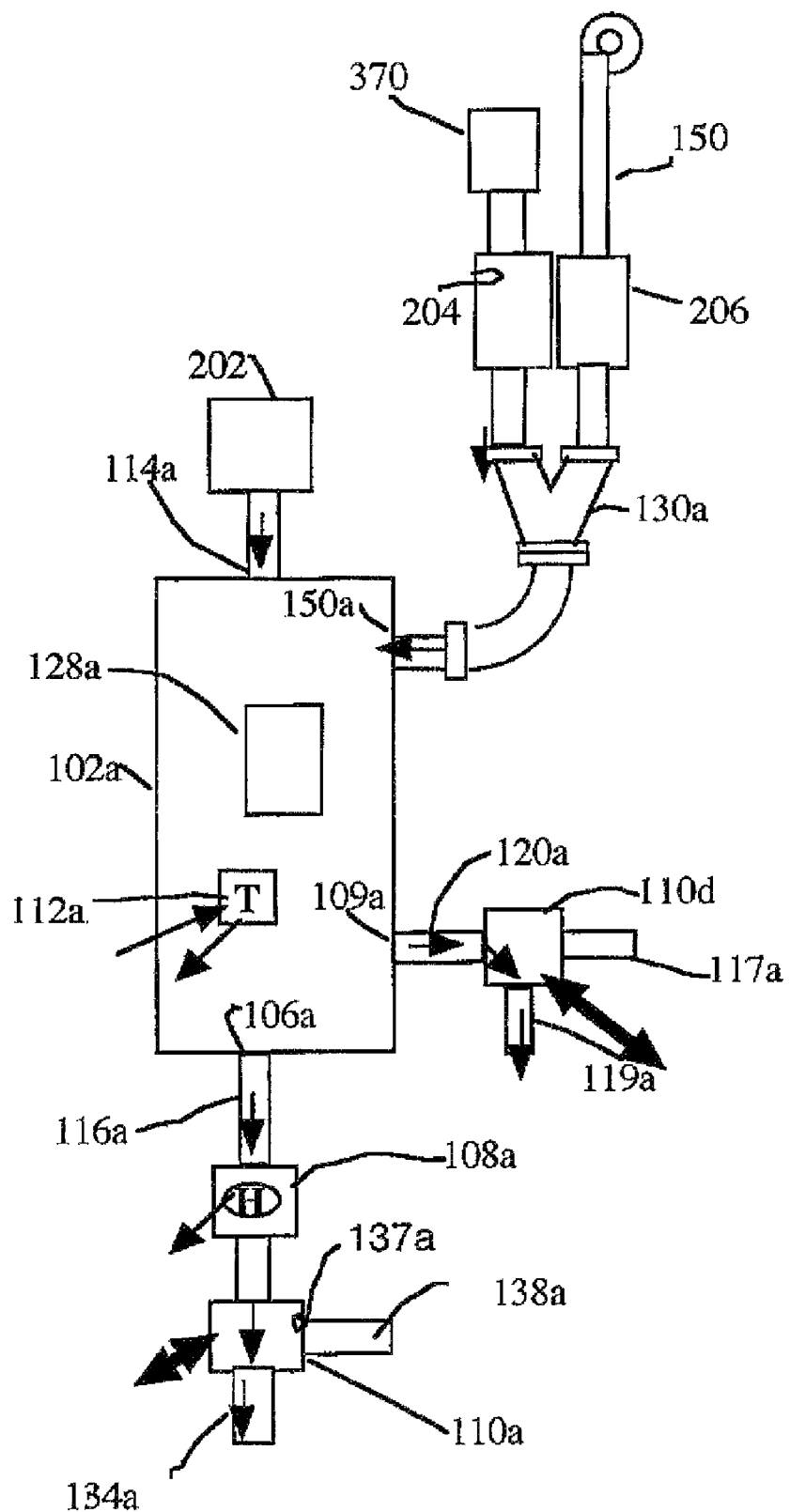
FIG. 1 illustrates the configuration of a dryer canister in a heating phase of the present invention.

FIG. 1 illustrates one of three dryer canisters 102 (designated 102a, 102b, 102c) in a heating phase of the present invention. As illustrated in FIG. 1, the dryer canister 102a includes an air input port 114a, an air output port 106a, exhaust gas heating port or outside air cooling port 250a, and the output port for these gasses 109a. In this heating phase, exhaust from the vehicle's catalytic converters would be fed this gas by one of the 3-output valve 204 from the catalytic converter 370.

Figure 2:
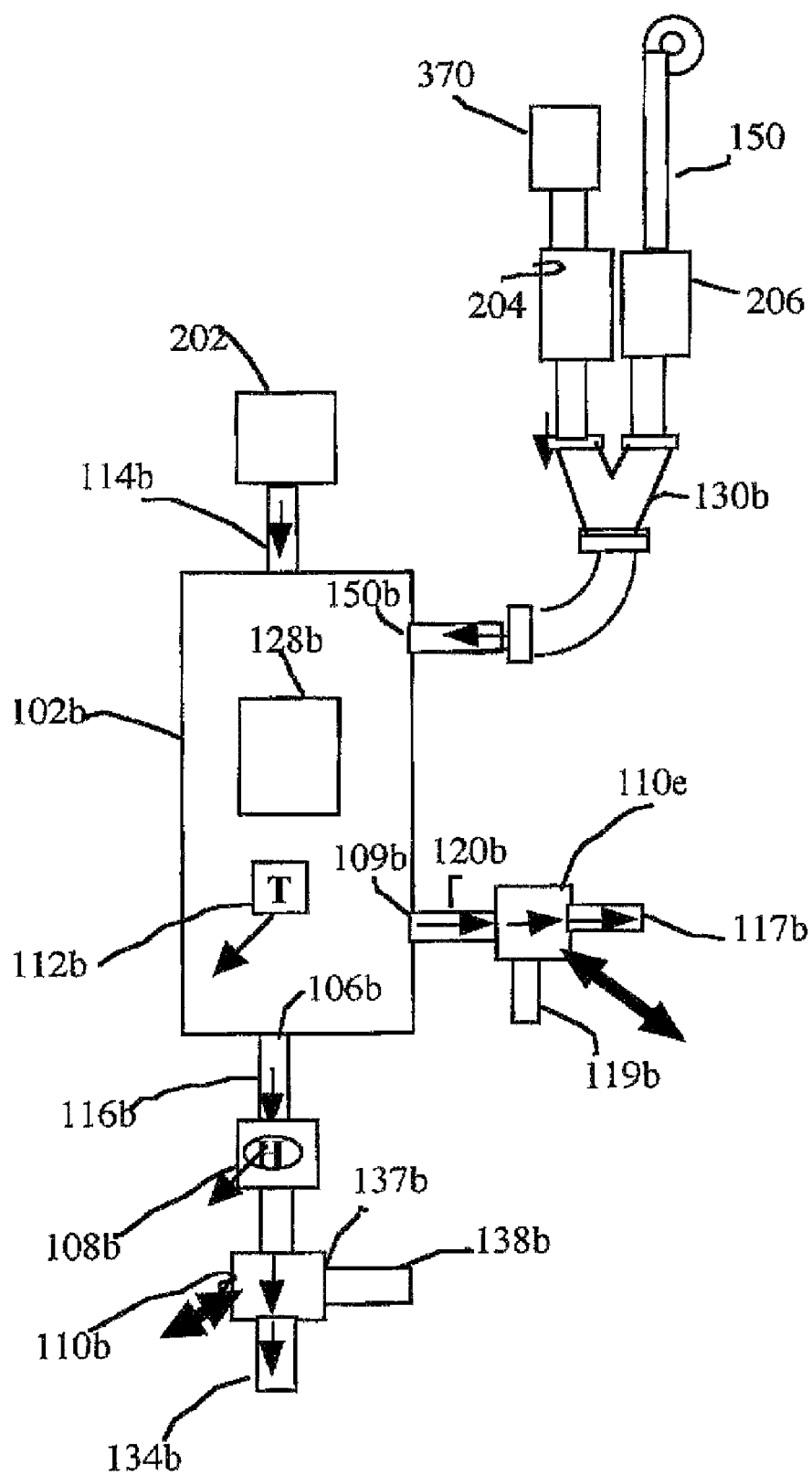
FIG. 2 illustrates the configuration of a dryer canister in a cooling phase of the present invention.

FIG. 2 illustrates the configuration of a dryer canister 102b in a cooling phase of the present invention. In this configuration, exhaust gasses are blocked from entering the heat exchanger by the in-line valve 204. Instead, a blower sends outside air into the heat exchanger 102b at port 250b and exits at port 109b.

Figure 3:
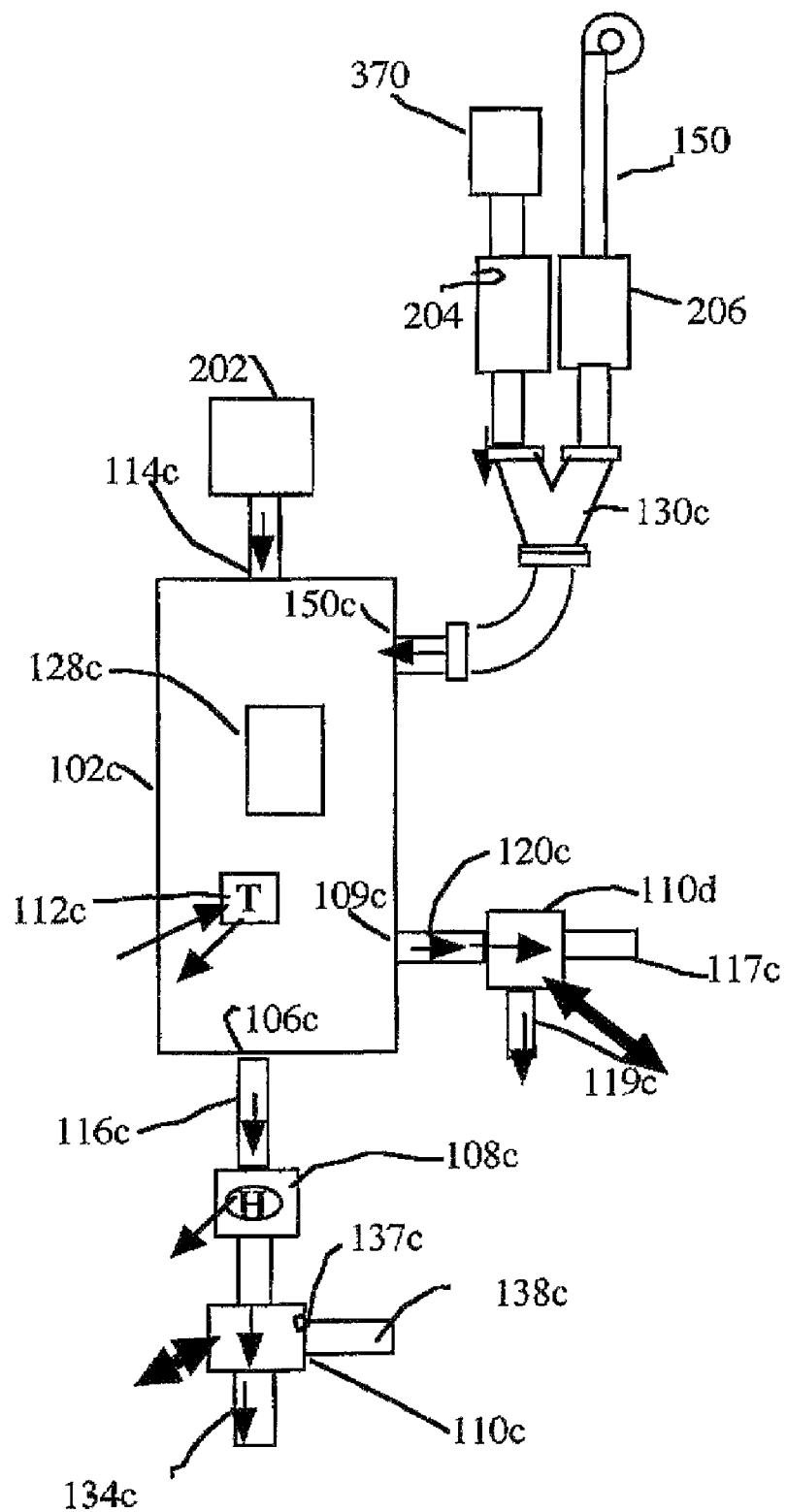
FIG. 3 illustrates the configuration of a dryer canister in a phase to provide dry fluid to the air intake manifold.

FIG. 3 illustrates the configuration of a dryer canister 102c configured to provide dry fluid to the air intake manifold.

Figure 4:
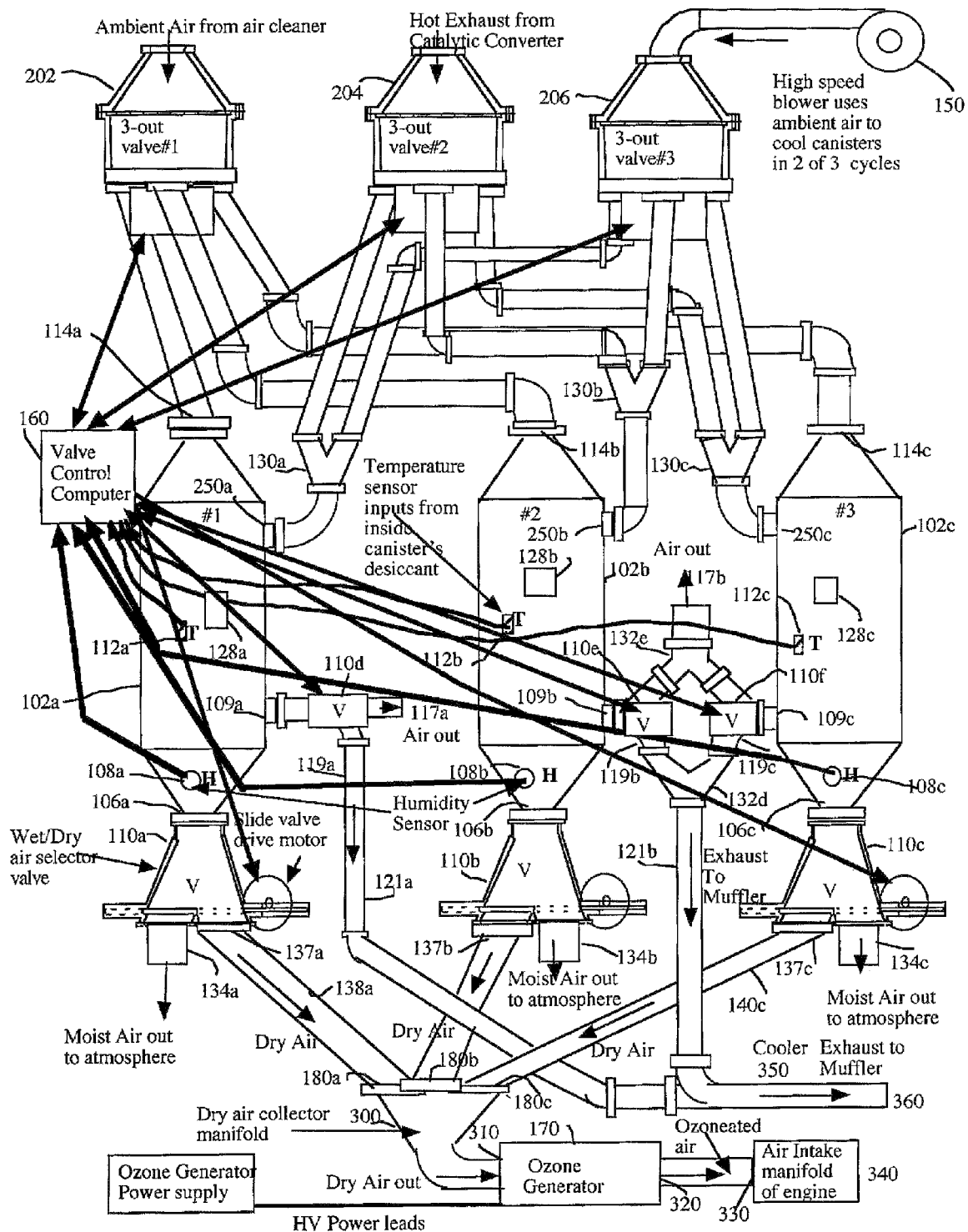
FIG. 4 illustrates a configuration of 3 dryer canisters simultaneously operating in all phases.

FIG. 4 illustrates a configuration of the three dryer canisters 102a, 102b, and 102c simultaneously operating in all phases.

Figure 5:
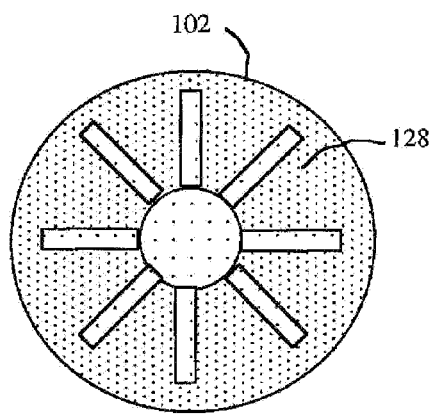
FIG. 5 illustrates a cross-sectional view of a dryer canister of the present invention.

FIG. 5 illustrates a cross-sectional view of a dryer canister 102 of the present invention, illustrating a desiccant 128 that surrounds the heat exchanger fins.

Figure 6:
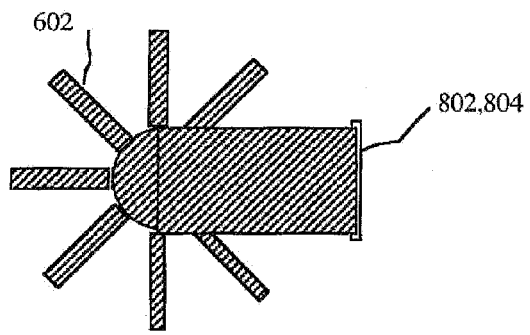
FIG. 6 illustrates an end view of the exhaust heated heat hollow exchanger fin.

FIG. 6 illustrates an end view of the exhaust heated heat hollow exchanger fin.

Figure 7:
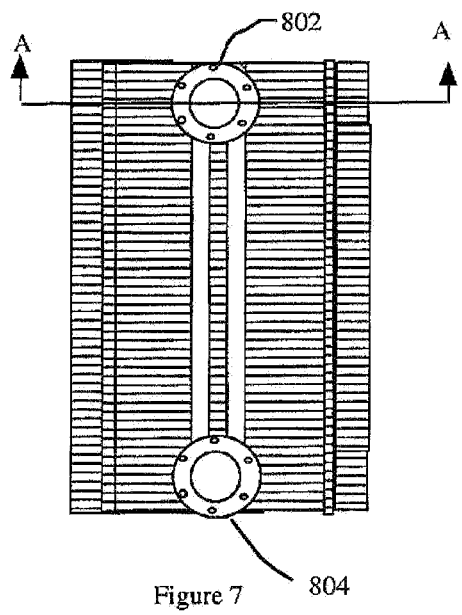
FIG. 7 illustrates a front view of a portion of the heat exchanger fin of the dryer canister.

FIG. 7 illustrates a front view of a portion of the heat exchanger fin of the dryer canister. The input port 802 or output port 804 is shown, indicating the heat exchanger is fed by a side port 802, and exhausts the heating or cooling gasses out of port 804.

Figure 8:
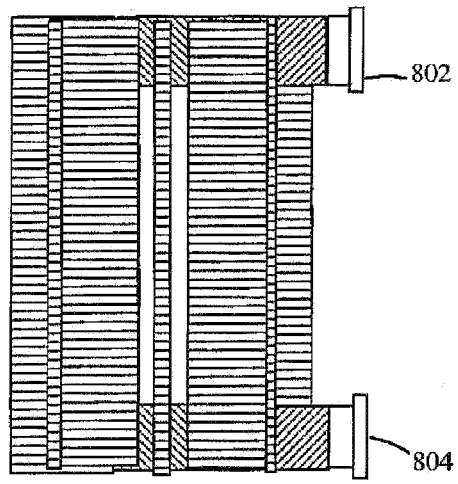
FIG. 8 illustrates a side view of the heat exchanger fin assembly in the dryer canister of the present invention.

FIG. 8 illustrates a side view of the heat exchanger fin assembly in the dryer canister of the present invention.

Figure 9:
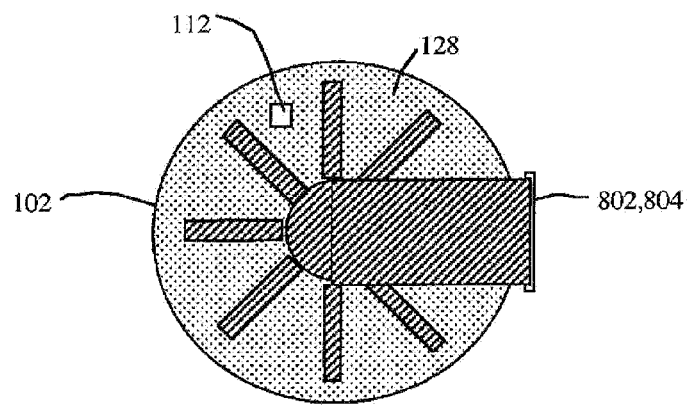
FIG. 9 illustrates a top cross sectional view of the dryer canister of the present invention.

FIG. 9 illustrates a top cross sectional view of the dryer canister of the present invention.

Figure 10:
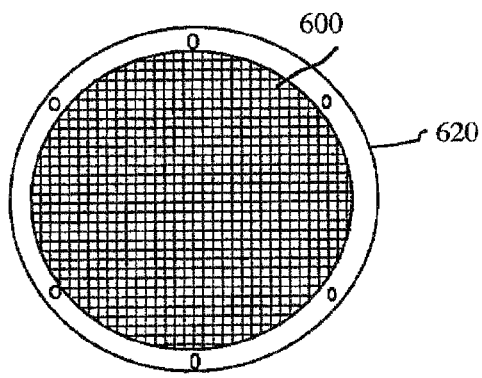
FIG. 10 is a view of the mesh retainer for the desiccant 600 that is at each end of the canister.

FIG. 10 is a view of the mesh retainer for the desiccant 600 that is at each end of the canister. The mesh pore size is chosen so that it is smaller than the granule size of the desiccant material.

Figure 11:
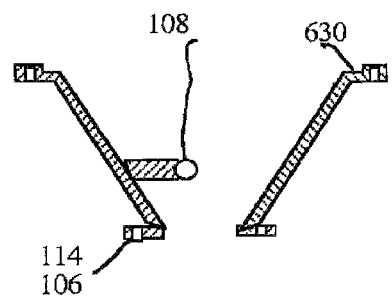
FIG. 11 is a cross sectional view of the end pieces of the canister.

FIG. 11 is a cross sectional view of the end pieces of the canister. The output end has additionally a post 1080 that holds a humidity sensor 108 in the middle of the outgoing air stream to measure the relative humidity of the air that is dried in the canister. The mesh retainer fits into the recess 630 in the end piece of the canister.

Figure 12:
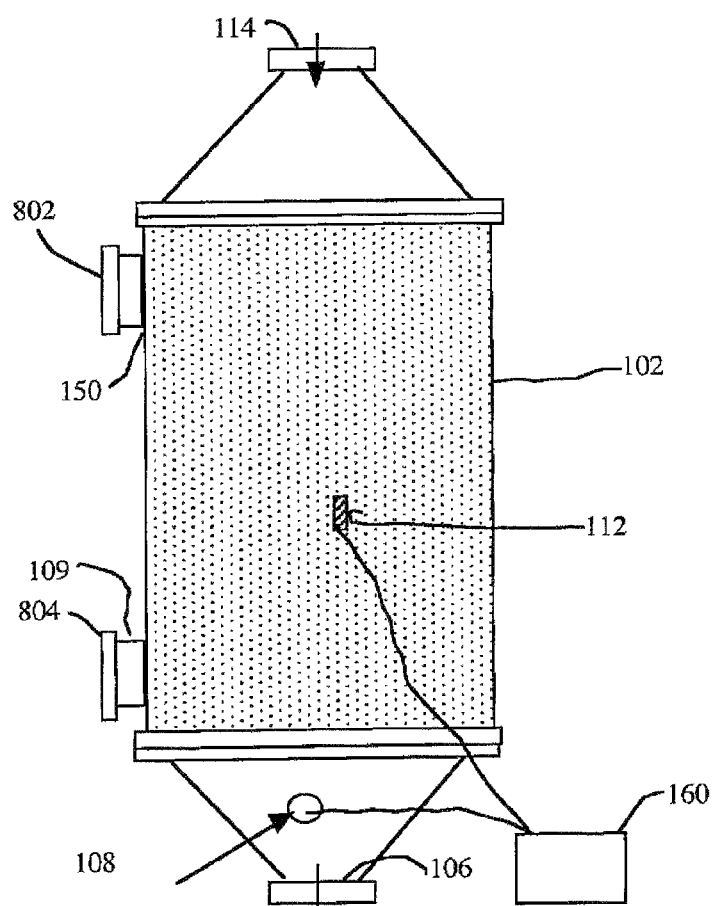
FIG. 12 illustrates a side view of the dryer canister of the present invention.

FIG. 12 illustrates a side view of the dryer canister of the present invention. The input flange 802 or output flange 804 of the internal heat exchanger. Each canister has a thermal sensor, a thermocouple or a thermister 112 to measure the internal temperature of the desiccant air dryer material. At the output end of each canister, a humidity sensor is positioned in the airflow. The input port for the heating is 250, and the exit port for this hot gas is 109. FIG. 12 also illustrates the connection between the thermal sensor 112 and the humidity sensor 108 to the valve control computer 160. The valve control computer 160, in addition to having analog voltage measuring input capability for the humidity and temperature readings, has a built-in timer to time the cycles, in case the humidity sensor is inoperable. The ends of the canister, shown in FIG. 13, hold this desiccant retainer in place.

Figure 13:
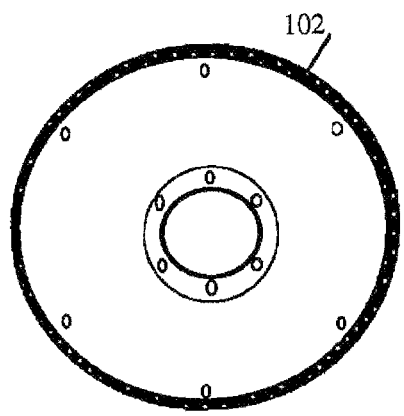
FIG. 13 illustrates an end view of the dryer canister of the present invention.

FIG. 13 illustrates an end view of the dryer canister of the present invention. FIG. 13 is representative of both ends of the air dryer canister 102.

FIG. 14 illustrates a side cross-sectional view of a 3-output port valve, with input port 106 and output ports 1606, 1608 and 1610 shown in FIG. 16. The top of the valve is item 100, which holds the valve plate 1404 in place between the valve top part 100 and the valve bottom 1402. One of the output ports of this 3-output valve is 1606.

FIG. 15 illustrates the sector plate 1404 of these 3 output port valves that has a wedge-shaped cutout 1564, through which gasses flow, that subtends ~114 degrees in angle from the center pivot point 1502. When the stepper motor rotates the valve plate 1404 by 120 degrees with a command from the valve control computer 160, another output port is selected.

FIG. 16 illustrates a view looking down into the valve from the top 100 of the valve. The three output ports 1606, 1608, and 1610 are shown. To make a gas seal from one port to another, the valve plate 1404 must be in contact with the three flat topped extensions of the valve body bottom 1402 (e.g., 1612, 1614, 1618).

FIG. 17 illustrates a 120 degree shifted cross sectional side view of this 3 output port valve. 1702 is the stepper motor that drives the valve plate 1404. Other valve outputs are illustrated as 1608 and 1610.

With the first heating phase, heat is brought into the dryer canister 102 from the exhaust of the engine's catalytic converter to reactivate the air dryer material/desiccant. FIG. 1 illustrates the dryer canister 102 having the first canister input port 114a, a first canister output port 106a, a second canister input port 250a and a second canister output port 109a.

The second canister input port 114b is connected to a first valve 204, and the second canister output port 120 is connected to a second valve 106b. The first canister output port 106a has a humidity sensor 108a in its air stream to measure the humidity, and it controls the third valve 110a from signals from the processor 170.

During the first heating phase, air from the high speed blower 150 enters the first canister input port 114a and exits the first canister output port 106a, and the third valve 110a directs the air through the third valve output port 134a, with moist air exiting the system in this heating phase. The first valve 204 directs heated gas from the exhaust of the vehicle's catalytic converter through the first valve input port 130a to the interior of the hollow heating fin 602, shown in FIG. 6 of the dryer canister 102; and the second valve 110d directs the heated air from the dryer material 128a of the dryer canister 102a through the second valve output port 109a to the vehicle exhaust 360. Consequently, the moisture collected in the dryer material 128a is released and removed from the dryer canister 102a via the port 134a.

In FIG. 2, the second phase (cooling) is illustrated. FIG. 2 illustrates the temperature sensor 112a which is connected to processor 160 which corresponds to the temperature of the dryer material 128a. After the temperature has reached a predetermined level, the processor 160 activates the first valve 204 and closes the port leading to the "Y" joint 130a and which feeds the port 250a of canister 102a. When healing is complete, valve 204 closes, shutting off the hot exhaust, and processor 160 opens valve 206 and allows cold outside air to be blown in.

FIG. 3 illustrates a third phase that provides dry air from the dryer canister 102c for use with the ozone generation subsystem 170. When the temperature sensor 112 outputs a signal to the processor 160 at a second predetermined value and the humidity sensor 108 outputs a signal to the processor 160 at a third predetermined value corresponding to a relative humidity between approximately 2%-5%, the processor 160 activates the third valve 110 to close the third valve output port 138 and to open the fourth valve output port 140c so that the dry air can be input to the ozone generating subsystem 170 which supplies ozone to the intake of a vehicle.

The dry air cooperates with the ozone, and both are input to the intake of the vehicle. As a consequence, the gas mileage of the vehicle is improved. FIG. 4 illustrates a system of three dryer canisters 102a, 102b, 102c which in sequence perform the functions in FIGS. 1-3. The function of each of the three dryer canisters 102a, 102b, 102c is time shifted so that one of the three dryer canisters 102a, 102b, 102c is performing the function described with FIGS. 1-3.

During the first time period the dryer canister 102a enters the heating phase, air from the air filter of the vehicle enters the first canister input port 114a through the first input selector valve 202 and exits the first canister output port 106a, and the third valve 110a directs the air through the third valve output port 138a. The second input selector 204 directs heated air from the exhaust of the vehicle through the first valve input port 130 to the dryer material 128a of the dryer canister 102a. and the second valve 106a directs the heated gas from the catalytic converter of the vehicle to heat exchanger 602 of the dryer canister 102a. Consequently, the moisture collected in the dryer material 128a is released and removed from the dryer canister 102a into the atmosphere.

In FIG. 4, and during the first time period, the second phase is illustrated for the operation of the dryer canister 102b. FIG. 4 illustrates the temperature sensor 112b which is connected to processor 160 and transmits a temperature signal to the processor 160 which corresponds to the temperature of the dryer material 128b. After the temperature signal has reached a predetermined level, the processor 160 activates the second input selector 204 to close the first valve input port 130b to stop the heated gas from the catalytic converter and rotates to the third position of the valve plate of the selector valve 206 to open the second valve input port 130b to direct cool air from the blower 150 to the heat exchanger in order to cool the dryer material 128b via the heat exchanger 602. Additionally, the processor 160 closes the second valve 110b to close the second valve output port 134b and activates the third valve 110b open the first valve output port 134a to discharge the moist air from the dryer material 128b to the atmosphere.

FIG. 4 illustrates a third phase that provides dry air to the dryer canister 102c to be used with the ozone generation subsystem 170. When the temperature sensor 112c outputs a signal to the processor 160 at predetermined value of humidity and the humidity sensor 108c outputs a signal to the processor 160 at a third predetermined value corresponding to a relative humidity between approximately 2%-5%, the processor 160 activates the third valve 110c to close the third valve output port 138c and to open the fourth valve output port 137c so that the dry air can be input to the ozone generating subsystem 170 which supplies ozone to the intake of the vehicle. The dry air cooperates with the ozone generator to produce substantially more ozone than if not processed by this system. The dry air plus the ozone are then sent to the intake manifold of the vehicle for combustion. As a consequence, the gas mileage of the vehicle is improved, and pollution generated is decreased.

FIG. 5 illustrates a cross section of the dryer canister 102 of the present invention. The cross section of the dryer canister 102 includes dryer material 128 and a fluid cooled fin. This cross section of the hollow fin is taken at section A-A shown in FIG. 7.

FIG. 6 illustrates an end view of an exhaust heated heat exchanger fin 602. FIGS. 7 and 8 illustrates a front view and a side view respectively of a portion of the dryer canister 102. 802 and 804 are respectively the input and output ports of this hollow fin assembly. FIGS. 7 and 8 illustrate an input/output flange 802 and 804 for exhaust heating. FIG. 7 is a front view, and FIG. 8 is a side view of these assemblies.

FIG. 9 illustrates a further cross section of the dryer canister 102 including the dryer material 128, the temperature sensor 112, the input/output flange 802 and 804 for the exhaust heating. FIG. 10 illustrates the retainer mesh that holds the desiccant in place.

FIG. 11 illustrates a side cross sectional view of the conically shaped end piece of the air dryer canister, showing the position of the humidity sensor near the center of the output air stream.

FIG. 12 illustrates a side view of the dryer canister 102 of the present invention and illustrates the input and output flanges 802/804 for inputting heating from the engine exhaust, or cooling from the blower 150. It also illustrates the filtered air input 114, and the processed (dried) air that exits through the output flange 106. It also shows the temperature sensor 102 and the humidity sensor 108 which are connected to the processor 160.

FIG. 13 illustrates a top view of the dryer canister 102 of the present invention.

FIG. 14 illustrates the selector valves 202, 204, and 206, which include a selector valve housing 1402 to house the selector valve top 100, a selector wheel 1404 to select the output ports 1606, 1608 and 1610, to receive the gas input which may be air or exhaust.

FIG. 15 illustrates the selector wheel 1404 which rotates about a center pivot 1502 and includes a selector hole 1504 of about 114 degrees of angular sub tense so that the gas input can be directed to the appropriate output port.

FIG. 16 illustrates a fixed base 1402, three exit apertures including a first exit aperture 1606, a second exit aperture 1608 and a third exit aperture 1610. The first exit aperture 1606, the second exit aperture 1608 and the third exit aperture 1610 are selected by the selector wheel 1404 to allow the exit gases to be directed to different locations. For example, the first exit aperture 1606 could supply the filtered from the atmosphere; the second aperture 1608 could supply the gases from the catalytic converter; and the third aperture 1610 could supply the gases from the high speed fan 150.

FIG. 17 illustrates a fixed base 1402 for the exit apertures 1606, 1608, 1610, and more particularly, the second exit aperture 1608 and the third exit aperture 1610 are illustrated. FIG. 17 additionally illustrates an indexing motor 1702 for turning the selector wheel 1404 to the desired position. The indexing motor 1702 is controlled by the processor 170.

There are at least 3 types of cooing suggested for the desiccant in the air dryer system.

1) Air cooling from outside air, flooding the inside of hollow heat exchanger fins as discussed in the text and shown in the drawings.

2) Water cooling with a separate set of cooling fins in the heat exchanger that are externally cooled by water flowing through them. The water cooling can be from an external air-water heat exchanger (radiator), or in the situation of a water-borne vehicle as a boat—from the water it is floating in.

3) Refrigerated cooling via a separate set of cooling fins in the heat exchanger.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A method for increasing the efficiency of an internal combustion engine, the method comprising the steps of:
   providing an ozone generator having a dry air collector manifold;
   operably connecting the ozone generator to an air intake manifold of the internal combustion engine;
   providing an air cleaner;
   providing a first three-way valve that receives ambient air through the air cleaner;
   providing a catalytic converter operably installed in the internal combustion engine;
   providing a second three-way valve that receives hot exhaust from the catalytic converter of the internal combustion engine;
   providing a high speed blower;
   providing a third three-way valve that receives air from the high speed blower;
   providing three dryer canisters, each dryer canister having three input valves adapted to receive air from either the first, second, or third three-way valve, each of the dryer canisters being provided with a dryer material, and further each dryer canister having two exit valves so that the air either vents to the atmosphere or is directed to the dry air collector manifold of the ozone generator;
   providing a switching valve to operatively control the two exit valves of each of the three dryer canisters, so that air leaving each of the three dryer canisters is directed to either the atmosphere or to the dry air collector manifold of the ozone generator;
   operably connecting each of the first, second, and third three-way valves to each of the three dryer canisters;

providing a valve control computer operably connected to the first, second, and third three-way valves, and also to the switching valves of each of the three dryer canisters;

adjusting via the valve control computer the first, second, and third three-way valves to a first phase, wherein the ambient air from the air cleaner is directed into a first of the three dryer canisters, and then directing the dried ambient air through the ozone generator to the internal combustion engine, while concurrently directing hot exhaust from the catalytic converter to the second of the three dryer canisters, and also concurrently directing air from the high speed blower to the third of the three dryer canisters, while simultaneously adjusting the switching valves so that the dry ambient air from the first of the three dryer canisters is directed to the dry air collector manifold of the ozone generator, while the hot exhaust from the second of the three dryer canisters and the air from the third of the three dryer canisters is vented to the atmosphere;

adjusting via the valve control computer the first, second, and third three-way valves to a second phase, wherein the first of the three dryer canisters receives hot exhaust from the catalytic converter, so that the first dryer canister is heated and dried by the hot exhaust gasses from the internal combustion engine, while the second of the three dryer canisters receives air from the high speed blower, and the third of the three dryer canisters receives air from the air cleaner and provides the air through the ozone generator to the internal combustion engine, while simultaneously adjusting the switching valves so that the dry ambient air from the third of the three dryer canisters is directed to the dry air collector manifold of the ozone generator, while the hot exhaust from the first of the three dryer canisters and the air from the second of the three dryer canisters is vented to the atmosphere;

adjusting via the valve control computer the three-way valves to a third phase, wherein the first of the three dryer canisters receives air from the high speed blower, so that the first dryer canister is cooled and further dried, while the second of the three dryer canisters receives air from the air cleaner and provides the air through the ozone generator to the internal combustion engine, while the third of the three dryer canisters receives hot exhaust from the from the catalytic converter, while simultaneously adjusting the switching valves so that the dry ambient air from the second of the three dryer canisters is directed to the dry air collector manifold of the ozone generator, while the hot exhaust from the third of the three dryer canisters and the air from the first of the three dryer canisters is vented to the atmosphere;

operably positioning a humidity sensor in each of the three dryer canisters so that the humidity of air passing through the three dryer canisters may be continuously measured; and operably connecting each of the humidity sensors to the valve control computer, so that the valve control computer can cycle through the first, second, and third phases responsive to the humidity measured.

\* \* \* \* \*